Figure 1:
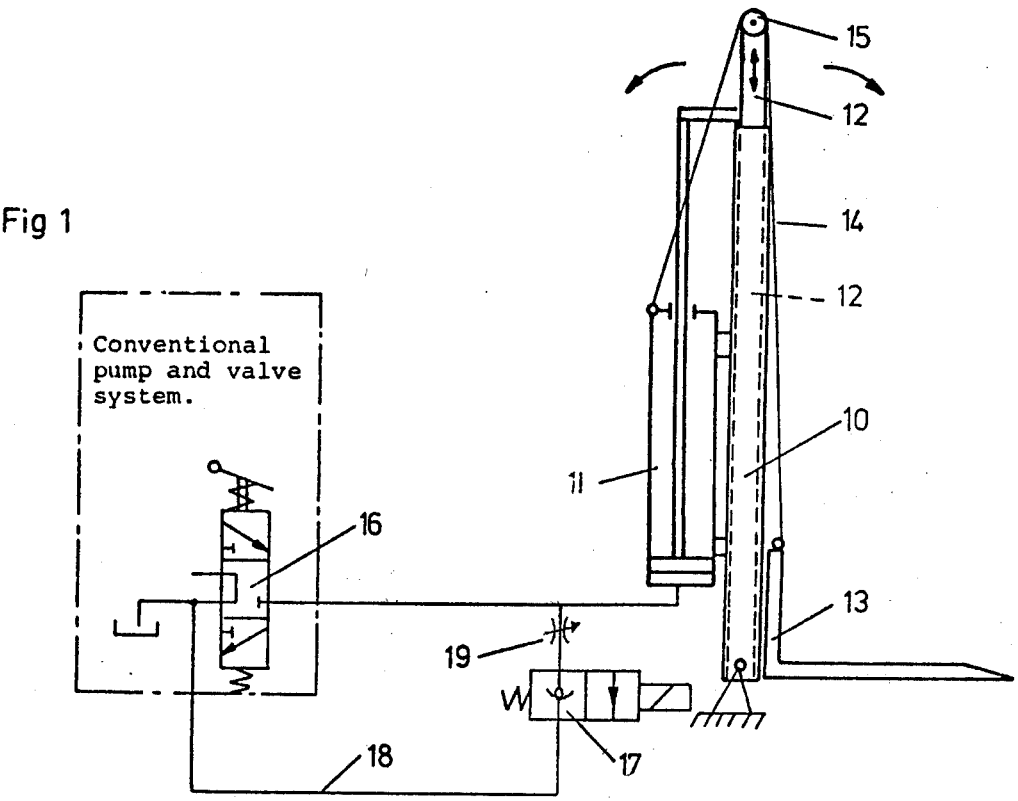

United States Patent [19]

Tjörnemark

[11] 4,130,183

[45] Dec. 19, 1978

[54] CONTROL SYSTEM FOR SELECTIVE POSITIONING OF A DISPLACEABLE DEVICE

[75] Inventor: Erik Tjörnemark, Tåstrup, Denmark

[73] Assignee: Islef & Hagen A/S, Denmark

[21] Appl. No.: 680,580

[22] Filed: Apr. 26, 1976

[30] Foreign Application Priority Data

Apr. 30, 1975 [DK] Denmark .............................. 1893/75

[51] Int. Cl.² ........................................... G05B 19/26
[52] U.S. Cl. .................................................. 187/9 R
[58] Field of Search ................ 318/267; 214/674, 670; 187/9 R

[56] References Cited

U.S. PATENT DOCUMENTS 3,818,302  6/1974  Rutledge .............................. 187/9 R

FOREIGN PATENT DOCUMENTS 708047  4/1965  Canada .................................... 187/9 R Primary Examiner—David Smith, Jr.

Attorney, Agent, or Firm—Steinberg & Blake

[57] ABSTRACT

A control system is disclosed for selective positioning a displaceable device, in particular the load carrying fork cage of a so-called fork-lift truck, into pre-selected positions or heights. The control system includes spaced apart pairs of associated switch elements, one element of each pair being mounted on a stationary guide, and the other element on the displaceable device. Each element pair defines one of the pre-selectable positions when the two elements are aligned, and in that case they further assume an actuated condition. Each element pair is connected in series with a particular selector switch, and when both the selector switch and the element pair are in an actuated condition, a coupling device is energized to cancel or reduce the load carrying ability. The displaceable device then sinks until the two elements of the actuated pair are separated, whereafter the displaceable device is kept stationary in a well defined position or height. The control system is semi-automatic, very simple and well-suited for mounting on already existing fork-lift trucks.

16 Claims, 5 Drawing Figures

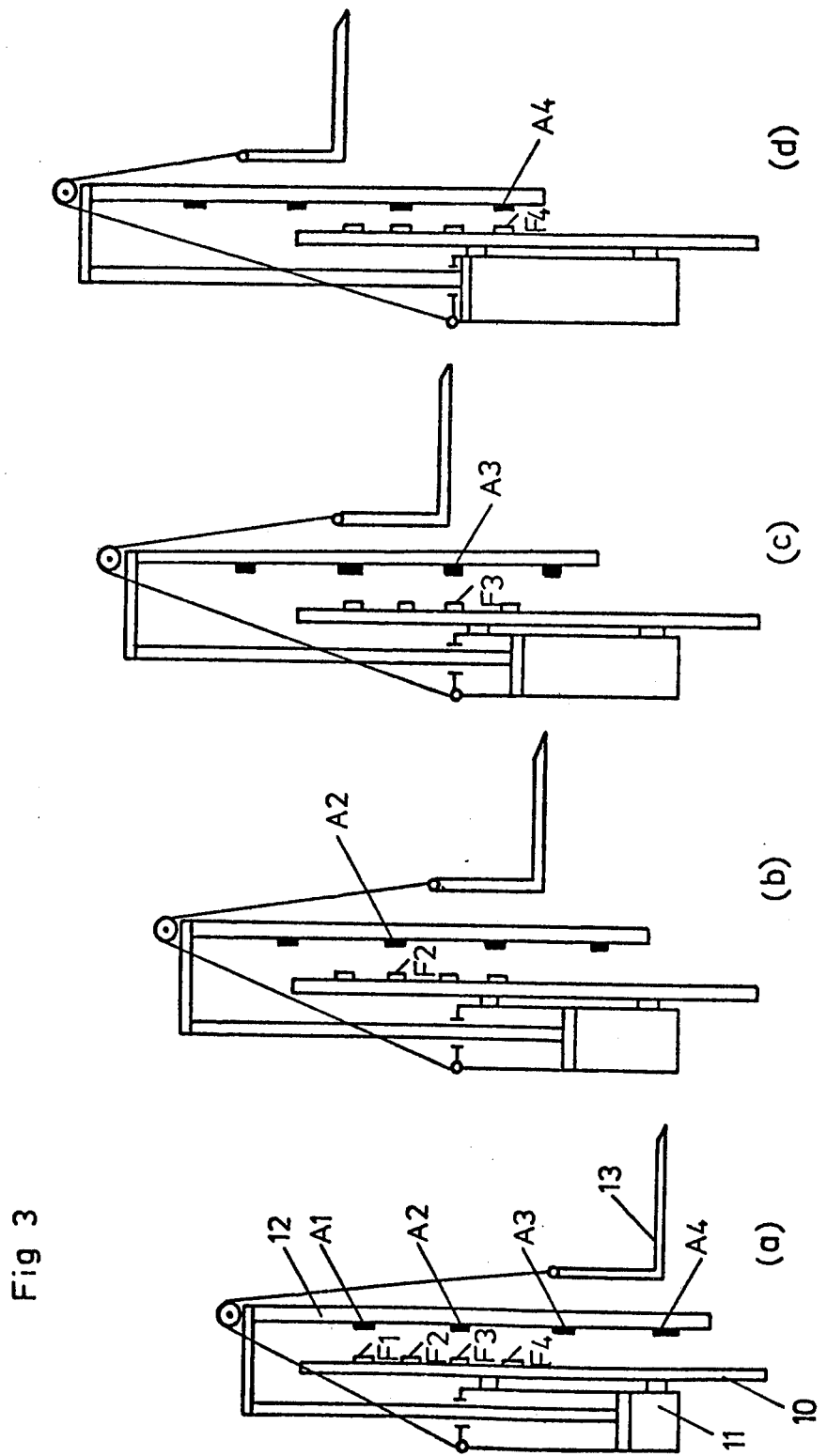

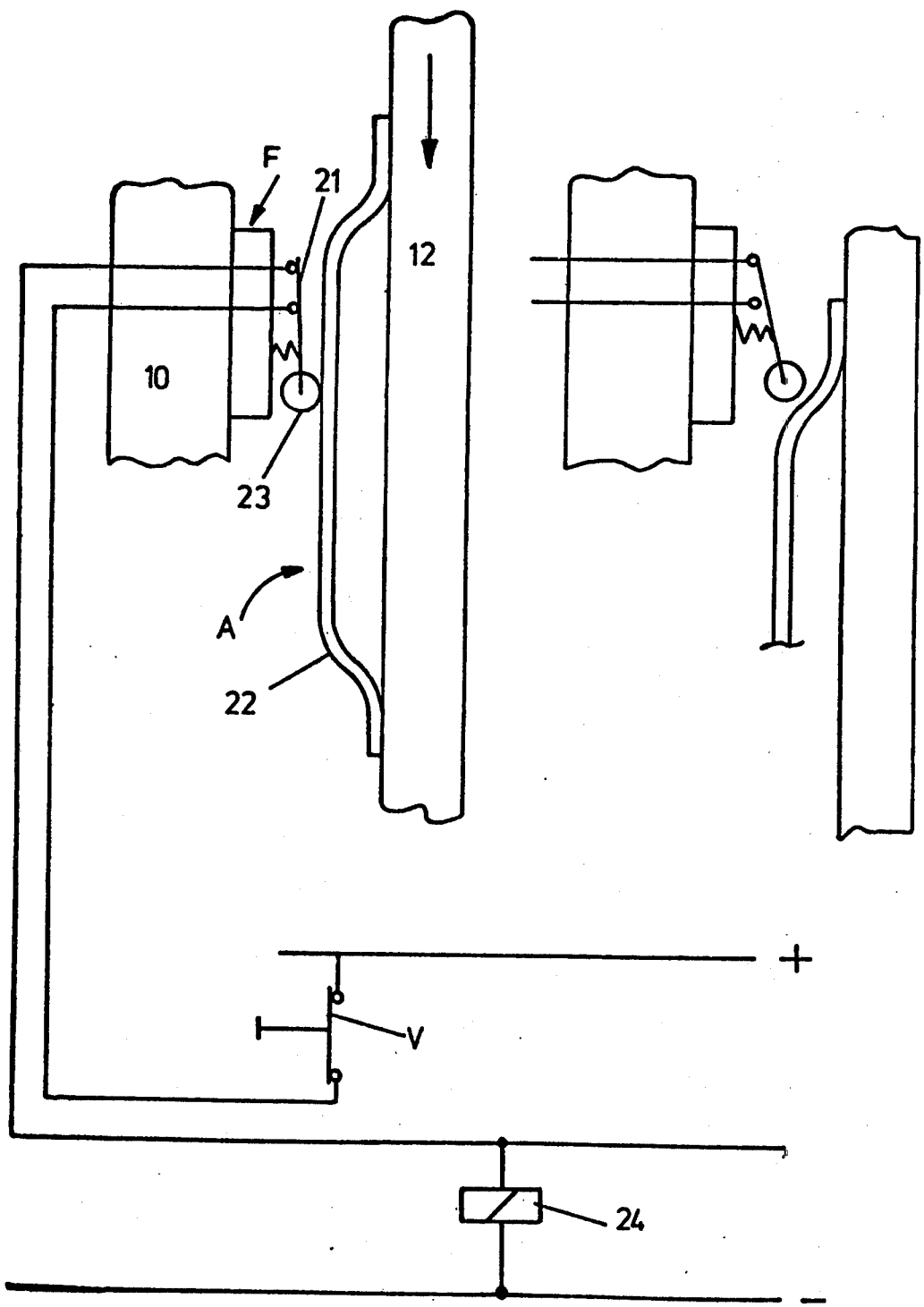

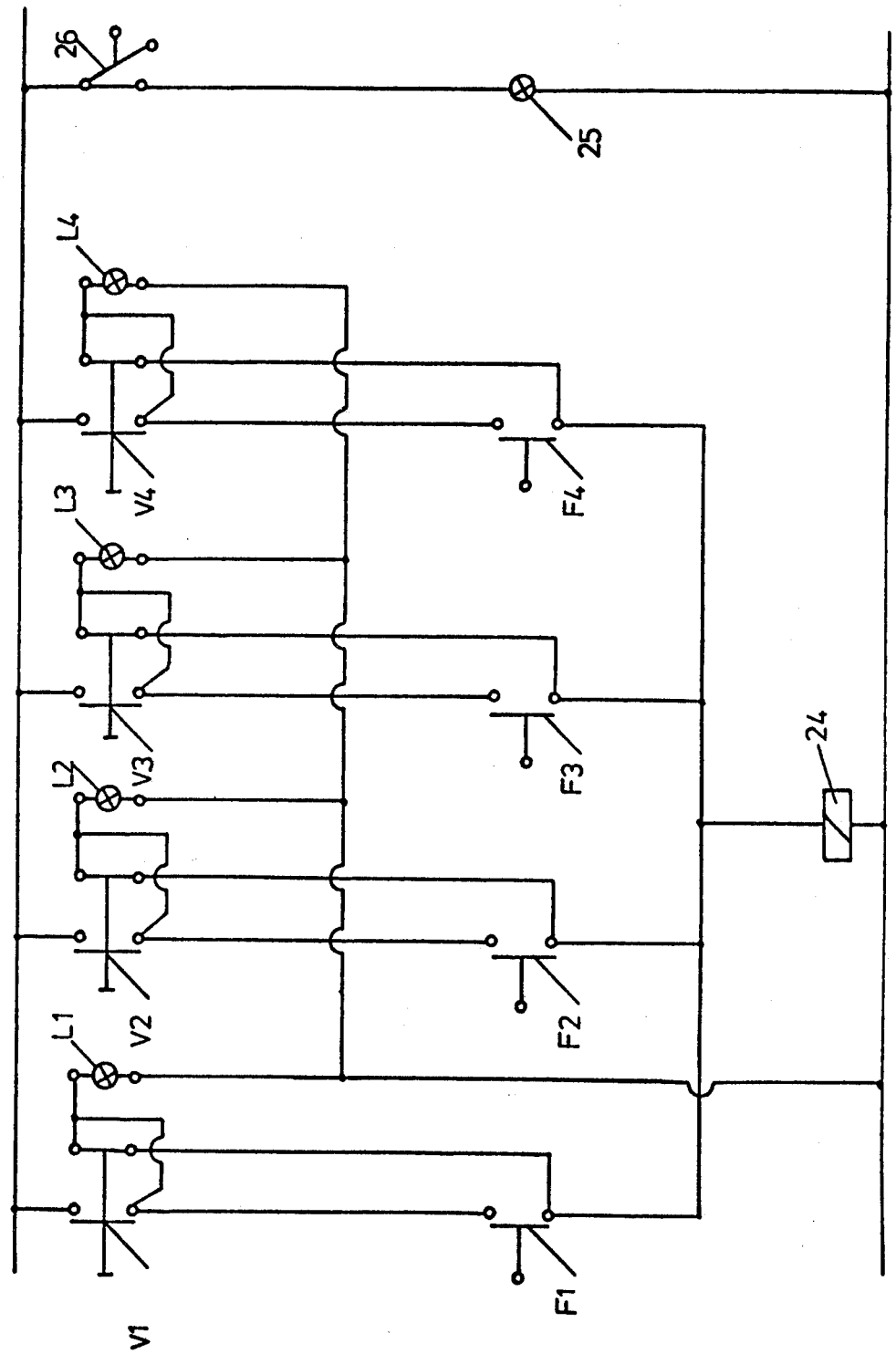

CONTROL SYSTEM FOR SELECTIVE POSITIONING OF A DISPLACEABLE DEVICE

The present invention relates to a control system for selective positioning of a displaceable device.

In a number of store facilities in which shelved goods are placed on pallets considerable losses often occur in the form of damaged or destroyed goods. In such facilities the goods are handled by means of fork-lift trucks, and safety regulations demand that the driver's seat in the truck be covered not only by a safety frame but also by a roof of a certain strength. Usually, these roofs are made of a transparent material but still, there is a pronounced tendency for the roof obstruct the truck driver's sight e.g. because of dirt.

Among other things because of the insufficient view, it may be difficult for a truck driver to adjust the forks of the truck to the correct height, and this often has the consequence that a pallet hits a shelf goods may fall off the pallet. This is unfortunate, both in view of the safety at the place of work and in view of damage caused to the goods. When a pallet is to be taken from a shelf, the truck driver must move the fork exactly into the pallet in question, which means that with the forks must be placed within a length of about 10 cm vertically and this makes considerable demands to the truck driver's abilities and measuring by eye, in particular when a pallet positioned at a high elevation is to be taken out. If often happens that the forks of the truck hit in a wrong place and instead hurt the goods on the pallet. This may also cause serious damage of the goods and consequent loss.

Thus, there is a great demand for auxiliary equipment by means of which the truck driver is in a simple way able to bring the forks of the truck precisely to one of a number of different heights.

Various fully automatic systems are already known, often denoted shelf selectors, by means of which the truck driver is able — just by operating a suitable selector switch — to place the forks precisely at a desired height. These known systems are, however, very complicated and therefore cost-consuming and, furthermore, it is not possible or at any rate it is very difficult to provide already existing trucks with such a known shelf selector system.

Obviously, it is not only in connection with fork-lift trucks for use in shelf storage that such a task is envisaged. Other equipment is also available, in particular lifting or hoisting equipment, in which the task is to adjust a movable part precisely and selectively in different positions relative to certain fixed positions. Consequently, it is the purpose of the present invention to provide a control system by means of which a displaceable device to assume a simple and precise way may be adjusted selectively in one of a number of possible positions.

When using the system according to the invention, an operator first actuates a pre-selector switch corresponding to the desired position and then the displaceable device is moved along the guide by means of the associated driving means. When the switch element pair associated with the actuated selector switch assumes its actuated condition, the breaker element together with the selector switch will cause an actuation of a coupling means, and at this time the operating system of the driving means is to be put into its neutral position. According to the invention, this is preferably done manually by the operator. In consequence of the actuated coupling means and due to the vertical position of the guide, the displaceable device thereafter moves downwards by itself, until the actuated condition of the switch element pair terminates. Hereafter, the displaceable device stays in a precisely defined position, as the action of the coupling means has ceased, for which reason the blocking or locking effect of the operating system has again entered into force.

Thus, it is a question of a control system which by the use of few and simple means performs the same operations as the much more complicated systems hitherto used. The control system according to the invention is, in addition, very well-suited for supplementing and improving systems already in existence.

The neutral positioning of the operating system, when the preselected switch element pair is in the actuated condition, may of course also be performed automatically, but this would partly complicate the system as a whole, and partly complicate the building-in of the control system according to the invention into systems already in existence. Since these are just the factors emphasized in connection with the present invention, the manual neutral positioning is preferred as already mentioned.

The number of switch elements of the two types may differ, as e.g. one and the same switch element of one type may form part of various pairs of associated switch elements together with various switch elements of the other type, and this one element thus forms part of all element pairs. In such cases the control circuit of the coupling means just has to include an appropriate counter unit pointing out the actuated condition of the pre-selected switch element pair among other occurring actuated conditions which are neglected. This would, however, also complicate the construction and according to the invention it is, therefore, preferred to use the same number of the two types of switch elements so that each element of one type only forms part of a single element pair together with a definite element of the other type. In this way, the control circuit may be arranged as simple as possible, since the selector switch alone is directly capable of pointing out the actuated condition of the switch element pair selected.

The switch elements themselves may differ in type and construction. The basic requirement is only that at least two switch elements of different types, when opposite each other together function as an actuated detector or breaker element. The switch elements may thus be any kind of electric switches, and contact-free or inductive detectors may also be used. In connection with hydraulic or pneumatic systems, valve elements of different kinds with associated actuators may come into question. However, according to the invention it is preferred that one switch element type in itself is a complete detector or breaker element, whereas the other swith element type is a pure actuator therefor. Again, this gives the simplest possible construction and is, in addition, particularly advantageous when building the system according to the invention into systems already in existence.

Furthermore, it is advantageous according to the invention that each actuator has a certain linear extention. By a suitable orientation of the actuators relative to the possible directions of movement of the displaceable device, a certain time of reaction for the neutral positioning in the operating system of the driving means is obtained, and this is particularly advantageous, when the neutral positioning is performed manually, as is preferred according to the invention. In a very simple and therefore preferred embodiment of the invention the actuators may thus simply be a row of suitably bent or cranked bars, band materials or the like, which may be secured by welding or in another way to suitable places along the travel of the displaceable device. The breaker elements may then be conventional micro switches only permitting current passage when the operating levers or the like associated therewith are in contact with an actuator.

It is advantageous that the control system according to the invention includes an alarm system for identification of an actuated selector switch. In connection with a system according to the invention, in which the control system is neutralized manually as explained above, it is however particularly advantageous that the control system simultaneously includes a second alarm system — auditive or visual — entering into action when and as long as the switch element pair associated with the actuated selector switch is in the actuated condition, i.e. when the two elements are completely or partly aligned. This second alarm system must deviate clearly from the first system with regard to the character of the alarm, and the presence of the alarm thus clearly indicates that the operator may or must neutralize, whereas the ceasing of the alarm after the neutral positioning indicates that the displaceable device has assumed the desired position.

Figure 2:
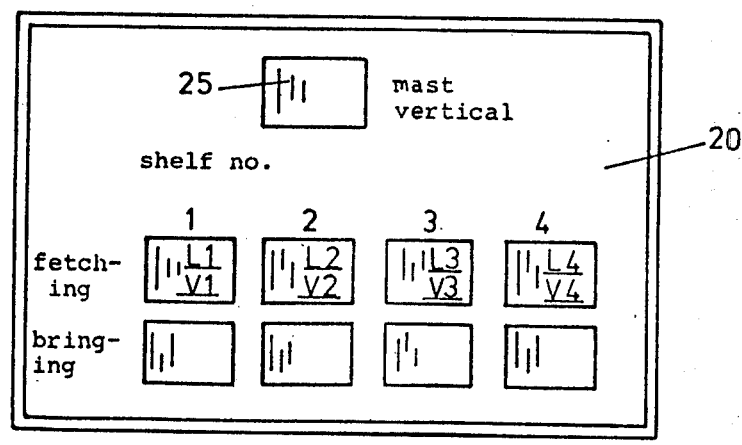

In the following, the present invention will be described in further details by way of example and with reference to the drawings wherein:

FIG. 1 is a schematic view of a traditional hydraulic truck equipped with a releasing or coupling device forming part of the control system according to the invention, FIG. 2 is a schematic view of a switch panel including selector switches for the control system according to the invention, FIG. 3 is a schematic view showing a lifting mechanism like the one illustrated in FIG. 1, in four situations during the operations of positioning when using the control system according to the invention, FIG. 4 is a schematic view illustrating an embodiment of the switch element pairs working together and forming part of the control system according to the invention, and FIG. 5 is an electric circuit diagram of an embodiment of the actuating system forming part of the control system according to the invention and having built-in alarm systems for the releasing or coupling device shown in FIG. 1.

First, the control system according to the invention will be explained in connection with its use as a shelf selector device for a fork-lift truck. As already indicated and as will be amplified in the following, this concrete use is, however, not the only one possible.

FIG. 1 shows schematically a well-known lifting mechanism used in a number of truck types. A fixed guide 10 carried partly a stationarily positioned cylinder 11 and partly a movable frame 12. The fork cage 13 itself is guided in the movable frame, and a cable or chain system 14 — one end of which is connected to the fork cage and the other to a stationary point on the truck passes, as shown, over a roller 15 or the like in the top of the movable frame 12. The hydraulic cylinder 11 moves the movable frame relative to the fixed guide 10 and as appears, a piston stroke of a given length causes the displacement of the fork cage 13 through twice the distance of the frame relative to the fixed guide 10.

As shown, the lower end of the fixed guide 10 may be pivotally mounted on the chassis of the truck about a horizontal axis, and the entire lifting mechanism may thus be moved to and retained in various inclined positions relative to a vertical plane.

The normal hydraulic driving means of the truck with its associated pump and valve systems is only schematically indicated, since its concrete construction has no importance to the present invention. The driving means of the system includes generally a manual control valve 16 comprising a lifting position, a lowering position and a neutral position with a blocking action.

This quite traditional truck construction is suppplemented or equipped with a control system according to the invention. A coupling or releasing device, which in the shown embodiment is a two-way magnet valve 17, is inserted in such a way that it has no influence on the hydraulic driving means, when the releasing devices is not actuated, and this means among other things that the fork cage 13 and a possible load thereon can be retained in any position when the control valve 16 is in its neutral position.

When a fork cage 13 e. g. on its way upwards passes a desired and pre-selected position, the releasing device is actuated, i.e. the magnet valve 17, by a controlling or actuating system which is to be described in more detail in the following. Simultaneously, or at least just after, the control valve 16 must manually be put into its neutral position, but the acutated magnet valve cancels the blocking action of the control valve. Consequently, the fork cage 13 sinks until the actuating of the magnet valve stops, and this takes place exactly when the fork cage is in the desired position, and thereby the magnet valve 17 is closed and the control valve 16 thus retains the fork cage in the desired position.

In the embodiment shown in FIG. 1, the magnet valve 17 is inserted in a shunt 18 across the control valve so that hydraulic oil can be directed past it and back to tank. By this arrangement it is, thus, not only the blocking of the control valve in its neutral position which may be cancelled by the actuated magnet valve, but the entire hydraulic driving system is in fact put totally or partly out of action, despite the position of the control valve, as the system is made "untight" by the actuated magnet valve. This has the important advantage that the lifting speed of the fork cage is considerably reduced, and thereby an increase of time available for the manual neutral-positioning of the control valve 16 is obtained.

Furthermore, the shunt 18 may preferably be provided with an adjustable throttle valve 19, as the funtion of the control system thereby may be adjusted in agreement with the influences in question, such as the weight of the load.

From the device so far described it is apparent that it is only necessary to make a few and very simple interventions in the normal hydraulic driving device of a fork truck in order to build-in a control system according to the invention.

The control or actuating system for the coupling or releasing means in the control system according to the invention includes partly a number of selector switches and partly a complex of associated switch elements, located in a suitable way on the mast of the truck as a kind of position detector for the fork cage. The selector switches are preferably as shown in FIG. 2 united in a switch panel 20 which at least includes a switch V, preferably of the push-button type for each selectable position. Especially in connection with a fork truck it is, however, advantageous that — as shown — two selector switches V are available for each store shelf, i.e. a switch for adjusting the fork cage into a "fetching" position and a switch for a "delivering" position. This will be explained in the following.

The switch or detector elements on the mast include two types, i.e. a first type F to be situated on the fixed guide, i.e. the guide 10, and a second type A to be situated on the movable portion, i.e. the movable frame 12. An examplification of the position of these switch elements is illustrated in FIG. 3, showing the lifting mechanism in four particular situations a–d. However, FIG. 3 is very schematic and, furthermore, a partly exploded illustration is used for the sake of clarity. In practice, both the cylinder 11, the guide 10 and the frame 12 would normally be located on the same central plane.

As indicated schematically, four spaced apart switch elements F1–F4 are positioned on the fixed guide 10, whereas the movable frame 12 carries four other switch elements A1–A4. These two sets of switch elements are arranged in pairs, including an element of each type in such a way that the elements of each pair partly influence each other for assuming an actuated condition, when they are completely or partly aligned, and partly determine one of the selectable positions for the fork cage as will be explained in the following.

In the four situations illustrated in FIG. 3, the switch element pair A1, F1 is in the actuated condition in situation a, the pair A2, F2 in situation b, the pair A3, F3 in situation c, and finally the pair A4, F4 is in the actuated condition in situation d.

The individual switch elements or switch element pairs may be of a number of different arrangements. The decisive matter is only that the two elements of each pair together either render it possible that a signal passes, or they emit themselves a signal as long as the element pair is in the actuated condition. In connection with the invention, it is preferred, however, that one element of each element pair is a separate detector or breaker element, whereas the other element is a pure actuator therefor. Hereby it is obtained that only actuators A can be positioned on the movable frame 12 which do not require supply lines, whereas the detector elements F and their associated supply lines can be positioned on the fixed guide 10 in which the lines can be mounted without problems.

The individual switch elements A and F may be adapted to be firmly mounted on the respective frame portions. However, it is advantageous that at least the elements of one type. e.g. the elements F, are adjustable at least within certain limits.

FIG. 4 shows schematically an example of a preferred arrangement of a pair of associated switch elements A, F, in which the element F is a breaker 21, whereas the element A is an actuator therefor. The actuator is a suitably bent band material 22 in a suitably way secured to the movable frame 12.

The breaker 21 is the type that is only kept actuated as long an operating means is exposed to an external influence. This is shown schematically in FIG. 4 by a roller 23 carried by a spring loaded switch lever. In the arrangement illustrated in FIG. 4 the actuated condition of the switch element pair in question consists thus in the fact that the breaker 21 is kept closed as long as the roller 23 is in contact with the actuator 22. As soon as the two elements pass each other, the actuated condition is discontinued, which means that the breaker 21 is again opened when the roller 23 no longer has contact with the actuator 22 as shown to the right in FIG. 4.

In addition, FIG. 4 illustrates how the switch element pair F, A may in principle be coupled into a control circuit for the magnet valve 17. The breaker 21 is as shown inserted in series with an associated selector switch V in the controlling or actuating circuit for an actuating relay 24 for the magnet valve 17. The selector switch V may be of the type which closes at a first activation and opens again at a succeeding activation.

Each of the pairs of associated switch element shown in FIG. 3 are in a similar way connected to an associated selector switch V1–V4, and if e.g. it is desired to adjust the fork cage 13 of the truck for fetching a pallet on shelf No. 2, this is first keyed into the selector switch panel 20 by operating the switch selector V2 which is thereby closed. The operator then starts the fork cage in the normal way by a suitable operation of the control valve 16, and when the switch elements A2 and F2 hereby reach the actuated condition shown in situation b of FIG. 3, the breaker element F2 closes. Hereafter, the condition shown to the left in FIG. 4 has set in, whereby the magnet valve 17 is opened by the relay 24.

Now the operator neutralizes the control valve 16, whereafter the actuated magnet valve 17 brings the movable frame 12 and thereby the fork cage 13 to sink at a speed determined by the throttle valve 19. This continues, until the condition shown to the right in FIG. 4 sets in, at which time the actuated condition is discontinued, since the breaker F2 is opened, whereby the magnet valve 17 returns to its closed condition. The control valve in neutral position is now again able to "carry" the fork cage 13, which is thus retained in its momentary position. Hereafter, the keyed selection of shelf may be cancelled or annulled by re-operating the selector switch V2, and the operator is able to drive forward toward the store shelves straight away. Presuming that the switch elements A2 and F2 are correctly adjusted relative to shelf No. 2, the forks of the truck will be received in the desired pallet on the shelf.

Thus, together with FIG. 3, the right part of FIG. 4 illustrates how a switch element pair determines one of the selectable positions for the fork cage 13.

During the adjustment of the fork cage just described it may occur that other switch element pairs assume their actuated conditions. In situation b of FIG. 3, the element pair A3, F3 is thus also in the actuated condition, but this has no effect since the associated selector switch V3 is open.

FIG. 5 shows an exemplification of how the electric system for actuating the magnet valve 17 may be arranged. It is apparent that the fork cage 13 may be adjusted into either of the four selectable positions by means of the system shown in a way quite similar to what is explained above.

Furthermore, FIG. 5 is an exemplification of a preferred alarm or signal means for the control system according to the invention. Each selector switch V is associated with a signal lamp L which is in the first place coupled thereto in such a way that the lamp is turned on when the selector switch V associated therewith is closed. The signal lamp remains turned on as long as the selector switch is closed, and the operator is thus able to see partly that a selection of position has been made and partly which position has been selected.

The signal lamps L are, in addition, cut in so that all lamps are alight, when the breaker element F associated with a closed selector switch is closed, i.e. when a pre-selected switch element pair is in the actuated position. Thus, the fact that all signal lamps are alight simultaneously indicates that the operator is to neutralize the control valve 16, and this has, furthermore, to take place, when the lamps are alight in this way in order that the desired position is obtained. When the fork cage therafter has fallen to the desired position because of the open magnet valve, the actuated condition of the switch element pair in question is discontinued, and all lamps but the one associated with the pre-selected position stop to light again. Thus, this indicates that the fork cage has assumed the desired position.

Especially in connection with a fork for use in shelf stores it is advantageous that the fork cage may be adjusted in both a "fetching" position and a "delivering" position for each shelf. When a pallet is to be placed on a shelf, the forks with the pallet have in fact to lift somewhat higher than is the case when the forks are to hit a pallet on a shelf during a fetching operation. Such a possibility may in a simple way be obtained by means of the control system according to the invention, as the system disclosed in connection with FIGS. 3, 4 and 5 may be arranged as a "fetching" system.

Quite a similar system having separate switch element pairs and selector switches for actuating the magnet valve 17 may simultaneously by arranged as a "delivering" system, the switch element pairs of which being positioned somewhat higher than the switch element pairs A, F in FIG. 3. Since both the fixed guide 10 and the movable frame 12 usually include two parallel rails, the two complexes of switch element pairs may thus advantageously be positioned on respective sides of the truck.

The selector switches for the "delivering" system may of course also be arranged on either the same switch panel 20 as the selector switches of the "fetching" system, or on a similar switch panel.

For the position adjustment described above of the fork cage 13 by means of the control system according to the invention it is of course a condition that the mast of the truck is subtantially vertical. In connection with trucks, the masts of which as indicated in FIG. 1 may be turned about a horizontal axis, it is therefore particularly advantageous that the control system according to the invention also includes a detector and signal system to indicate if and when the mast is vertical. The detector part of this system may e.g. be a switch element of the same type as the breaker 21 of FIG. 4.

Such a breaker may in a simple way be mounted in a fixed position relative to the truck in such a way that the breaker is only closed when the mast is vertical. The breaker may e.g. be operated by an actuator like the actuator 22 of FIG. 4, suitably positioned on the outer side of the fixed guide 10.

The breaker element may be connected to a signal lamp 25 on the switch panel 20 as illustrated in FIG. 2, and the signal of this lamp must of course deviate from the signal of the selector switch lamps, when these selector switch lamps L1–L4 — as shown in FIG. 2 — are inserted in the various selector switches V1–V4.

In FIG. 5, this additional detector and signal system for vertical adjustment of the mast is shown schematically, since the detector switch 26 and signal lamp 25 connected thereto in series are shown cut in across the power source of the electric actuating system.

Especially in connection with a fork truck on pneumatic tyres, a particularly heavy load which is to be put on a shelf may cause a strong compression of the tires. This may have the consequence that the pallet hits the shelf, e.g. if the switch element pairs are positioned after the shelves with the tires strongly inflated and without load on the fork cage. In particular in stores, in which goods of very varying weights are handled, it may therefore be advantageous that the control system according to the invention also includes an adjusting system by means of which at least one set of switch elements in a simple way may be adjusted relative to a fixed reference, mostly being a floor surface.

Such an adjusting system may e.g. and in a particularly simple way be obtained by the switch elements F being carried by the fixed guide 10 through a common carrying element which may be displaced in parallel along the guide 10. The lower end of this carrying element may thus by simple means be brought into contact with the floor surface in connection with each individual delivering operation, whereby a possible deformation of the pneumatic tyres because of very heavy loads may be compensated for.

Even though the control system according to the invention has been described as a shelf selector device for a fork-lift truck, other applications are, however, also possible. Thus, the control system according to the invention may be used in connection with such transportable lift units which are used e.g. on building sites for transports to and from scaffolds at different heights. Such lifts are usually operated manually by an operator and since goods are transported to a large extent placed on carriages or the like, it is essential that the bottom of the lift cage may be placed rather precisely in plane with the scaffoldings so that a carriage without difficulty can be driven from the lift cage and onto the scaffolding surface.

The control system according to the invention may, in addition, by used in connection with a number of purely mechanical hoisting or lifting equipments. In this case the releasing or coupling means associated with the system according to the invention may be a coupling of a suitable, remotely operable mechanical type. Thus, the coupling means may be an electrically operated friction coupling which in its actuated condition is only able to transfer a turning moment of a certain maximal size.

The actuating system for the releasing or coupling means may, besides, be of a pneumatic or hydraulic type, and in this case the various switch elements and the selector switches must be suitably adapted valve elements.

As is apparent from the above description, the structure of the invention includes a guide means 10 and a movable means 12 guided for movement by the guide means 10. A drive means 11 is operatively connected with the movable means 12 for moving the latter with respect to the guide member 10, this drive means 11 providing for the movable means 12 movement in opposite directions with respect to the guide means 10. Thus, when fluid under pressure is applied beneath the piston of the drive means 11, the movable means 12 will be driven upwardly with respect to the guide means 10, in the position of the parts shown in the drawings, while when pressure fluid is free to flow out of the cylinder beneath the piston of the drive means 11, the drive means 11 provides for movement of the movable means 12 in an opposite downward direction with respect to the guide means 10. The unit 16 forms a manually operable means operatively connected with the drive means 11 and is manually displaceable between an operating position rendering the drive means 11 operable and a rest position blocking operation of the drive means 11. The unit 17 forms an electrically-responsive automatic means operatively connected with the drive means 11, this automatic means when electrically energized providing for operation of the drive means 11 in that the latter is free to provide for downward movement of the movable means 12 in the operating position of the automatic means 17. This automatic means 17 when not energized automatically assumes its rest position shown in FIG. 1 where it blocks operation of the drive means 11. The relationship between the manually operable means 16 and the automatic means 17 is such that when the latter is in its operating position it will bypass the manually operable means 16 even if the latter is in its rest position shown in FIG. 1, whereas the manually operable means 16 can be placed in its operating position to operate the drive means 11 even if the automatic means is in its blocking position which is shown in FIG. 1.

The guide means 10 carries a plurality of positioning switch means F distributed along the guide means 10 and with respect to which the movable means 12 is displaceable, this movable means 12 carrying a switch-closing means A for automatically closing the several positioning switch means F as the movable means 12 moves with respect to the guide means 10 in such a way that different positioning switch means F are closed respectively in different positions of the movable means 12 with respect to the guide means 10. The several positioning switch means F are located in an electrical circuit which includes a plurality of manually operable selecting switch means V which are respectively connected in series with the several positioning switch means F. The electrically responsive automatic means 17 is located in this electrical circuit in such a way that this automatic means 17 will be energized upon closing of a switch means F which is in series with a closed selecting switch means. Thus, the operator will manually operate the manually operable means 16 to set the drive means 11 into operation until the movable means 12 is approximately at a selected position with respect to the guide means 10. The selecting switch means V corresponding to this selected position will of course have been previously closed by the operator. Thus, when the movable means 12 is in the region of the desired position, the switch-closing means A will close the particular positioning switch means F which corresponds to the selected position, and since the selecting switch means V corresponding to the selected position is also closed, the automatic means 17 becomes energized. Of course once the approximate position of the movable means 12 has been reached the operator returns the manually operable means 16 to its rest position blocking operation of the drive means 11, but the latter continues to operate due to the energizing of the automatic means 17 which permits the movable means 12 to continue to move until the particular switch means F is automatically opened, whereupon the automatic means 17 also assumes its rest position, thus blocking the drive means 11 against further operation and maintaining the movable means 12 at the desired position. Of course the operator will open the previously closed selecting switch means before the next operation. The lamps L are respectively connected electrically with the plurality of selecting switch means to indicate when a particular selecting switch means has been closed by the operator, while all of the lamps become illuminated, as set forth above, to indicate to the operator that the movable means has reached the region of the desired position, thus indicating to the operator that the means 16 must be manually returned to its rest position.

I claim:

1. In a control system for a conventional apparatus which includes a movable means to be selectively positioned at a selected one of a plurality of locations, guide means cooperating with said movable means to guide the latter for movement with respect to said guide means to said plurality of locations, drive means operatively connected with said movable means for moving the latter with respect to said guide means, and manually operable means having operating and rest positions to each of which said manually operable means is at any time movable by the operator, said manually operable means being operatively connected with said drive means for rendering the latter operable when said manually operable means is in in said operating position thereof and for blocking said drive means against operation when said manually operable means is in said rest position thereof, said control system comprising electrically-responsive automatic means also connected operatively with said drive means and also having operating and rest positions, said automatic means when electrically energized automatically assuming said operating position thereof and cooperating with said drive means for rendering the latter operable, said automatic means when unenergized assuming said rest position thereof and cooperating in the latter rest position thereof with said drive means for blocking the latter against operation, said manually operable means and said automatic means both being operatively connected with said drive means for rendering the latter operable when either one of said manually operable and automatic means is in said operating position thereof even though the other of said manually operable and automatic means is in said rest position thereof, a plurality of normally open positioning switch means carried by said guide means and distributed therealong at locations corresponding to the positions of said movable means to be selected, said movable means carrying a switch-closing means cooperating with said plurality of positioning switch means for respectively closing said plurality of positioning switch means when said movable means is respectively situated at said positions which are to be selected, an electrical circuit including said plurality of positioning switch means and said electrically-responsive automatic means, and a plurality of manually operable selecting switch means also located in said electrical circuit and respectively connected in series with said plurality of positioning switch means, said plurality of selecting switch means respectively corresponding to the positions of said movable means to be selected so that the operator will close one of said selecting switch means corresponding to the selected position for said movable means, whereby the operator can operate said manually operable means to render said drive means operative to move said movable means at least approximately to a selected position where said switch-closing means closes that one of said plurality of positioning switch means which corresponds to the selected position of said movable means, while the selecting switch means corresponding thereto has been previously closed, so that when said movable means has been displaced at least approximately to said selected position said automatic means will be energized to render said drive means operative even though the operator has returned said manually operable means to said rest position thereof, said drive means continuing to operate until said switch-closing means moves with respect to the closed positioning switch means to a location opening the latter, whereupon said automatic means automatically assumes said rest position thereof blocking further operation of said drive means and thus maintaining said movable means in the selected position.

2. The combination of claim 1 and wherein a plurality of electrical indicating means are connected in said electrical circuit operatively with the plurality of selecting switch means for indicating to the operator which of said selecting switch means has been closed to select a given position for said movable means.

3. The combination of claim 2 and wherein all of said indicating means are connected into said circuit to be simultaneously energized when the movable means is in the region of the selected position thereof, for thus giving to the operator a signal to return the manually operable means to said rest position thereof.

4. The combination of claim 1 and wherein said switch-closing means carried by said movable means includes a plurality of switch-closing elements located along said movable means for respectively closing the several positioning switch means when said movable means reaches the several positions thereof.

5. The combination of claim 4 and wherein the number of said elements of said switch-closing means equals the number of said positioning switch means.

6. The combination of claim 1 and wherein each of said positioning switch means includes a switch-closing member which normally has a position opening the particular positioning switch means, while said switch-closing means includes a mechanical element acting only mechanically on said switch-closing member of each of said positioning switch means for displacing the switch-closing member to a switch-closing position when the movable means reaches given positions with respect to said guide means.

7. The combination of claim 6 and wherein said mechanical element has a predetermined length in the direction of travel of said movable means for maintaining a given positioning switch means closed when said movable means is in the approximate range of a selected position thereof.

8. The combination of claim 7 and wherein said mechanical element is in the form of an elongated rod having at least one cranked end fixed to said movable means and having spaced from the latter an elongated portion to actuate a positioning switch means.

9. The combination of claim 1 and wherein said guide means has a generally upright attitude while a pivot means is connected with said guide means to support the latter for turning movement about a horizontal axis.

10. The combination of claim 9 and wherein an indicating means cooperates with said guide means for indicating the attitude thereof.

11. The combination of claim 1 and wherein an adjusting means is operatively connected with said plurality of positioning switch means for adjusting the location thereof with respect to said guide means.

12. The combination of claim 11 and wherein said guide means has a generally upright attitude while said adjusting means includes a support movable with respect to said guide means and carrying said plurality of positioning switch means, said support being adapted to engage a floor for providing an accurate location of the elevation of the plurality of positioning switch means irrespective of the elevation of said guide means.

13. The combination of claim 1 and wherein said drive means is a hydraulic drive means, a pair of hydraulic circuits each communicating with a source of hydraulic fluid and both connected operatively with said hydraulic drive means, one of said circuits including said manually operable means and the other of said circuits including said automatic means, and said other circuit bypassing said one circuit and said manually operable means.

14. The combination of claim 13 and wherein said automatic means includes a magnetic valve assuming a closed position in the rest position of said automatic means and an open position in the operating position of said automatic means.

15. The combination of claim 14 and wherein said circuit which includes an automatic means also includes an adjustable throttle valve means.

16. The combination of claim 1 and wherein said guide means has a generally upright attitude while said movable means is movable in a generally vertical direction with respect to said guide means, said manually operable means having at least one operating position cooperating with said drive means for rendering the latter operable to raise said movable means with respect to said guide means, and said automatic means, when in said operating position thereof, cooperating with said drive means for controlling downward movement of said movable means by gravity, said movable means being situated higher than said selected position when situated approximately at said selected position so that said automatic means is energized when said movable means has been moved upwardly beyond said selected position, whereby said automatic means will automatically assume said rest position thereof during downward movement of said movable means by gravity.

* * * * *